June 2, 1931.  J. J. EHEMANN ET AL  1,807,690
SAFETY DEVICE
Filed May 4, 1929   2 Sheets-Sheet 1
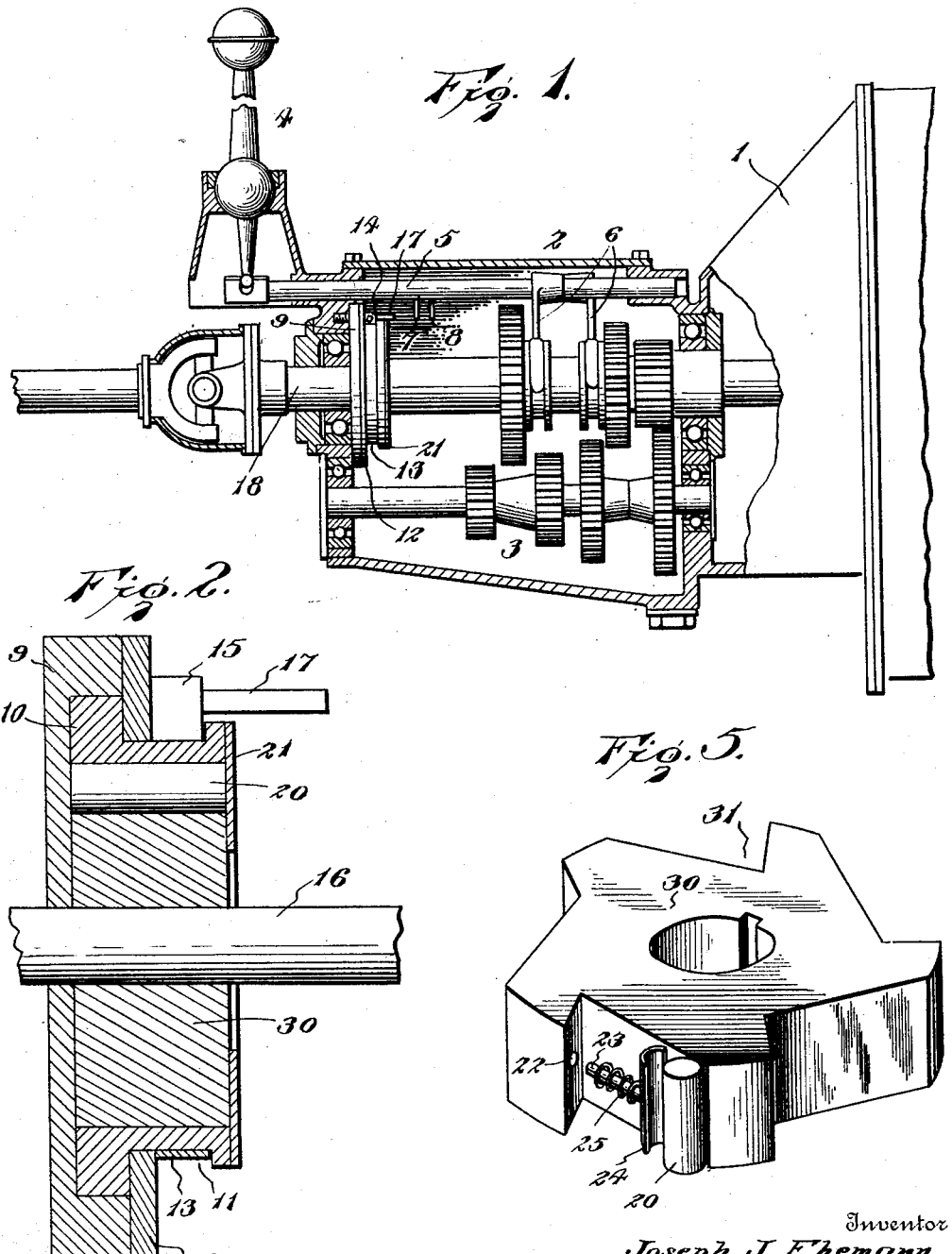
Inventor
Joseph J. Ehemann,
Benjamin F. Singer
By Lacey & Lacey, Attorneys

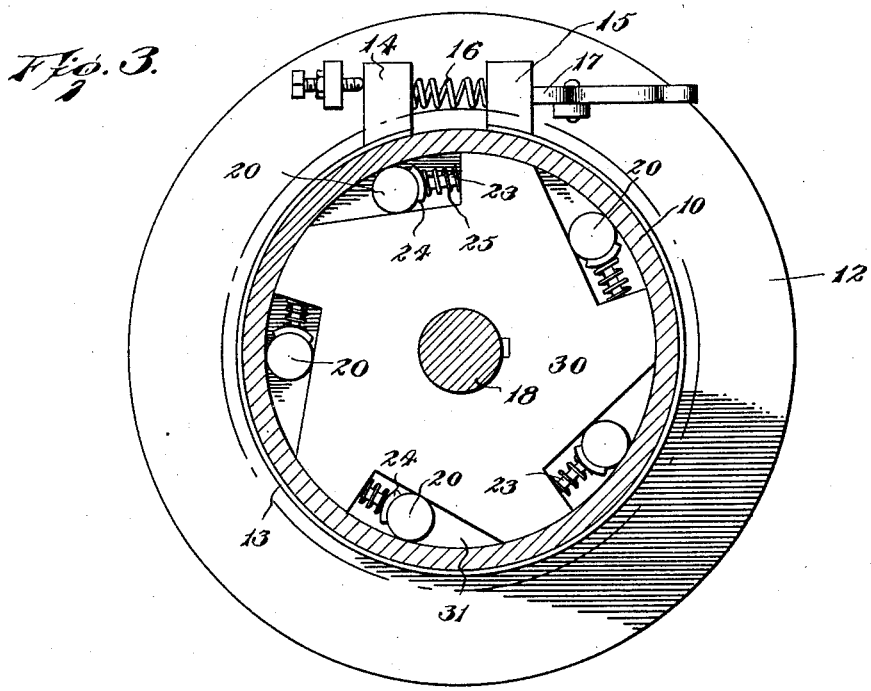
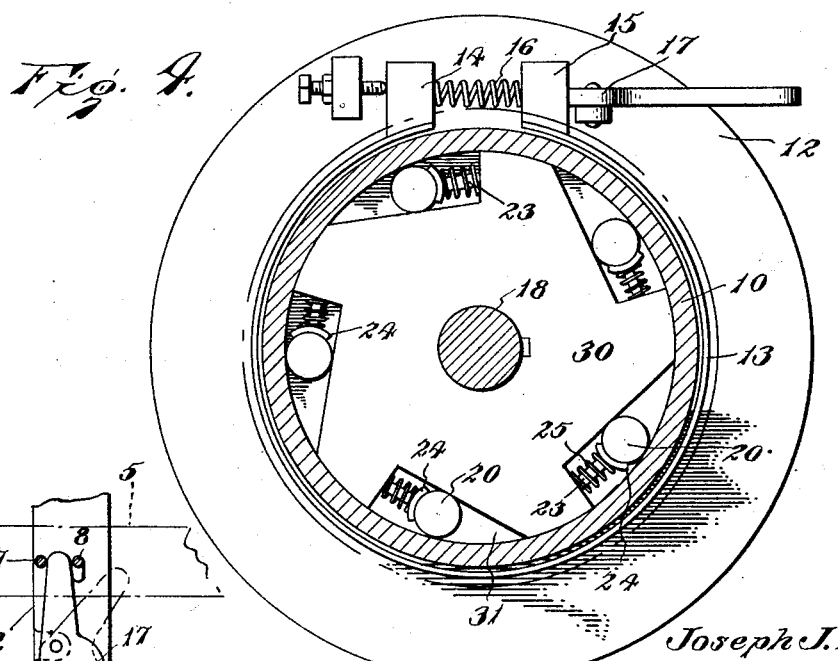
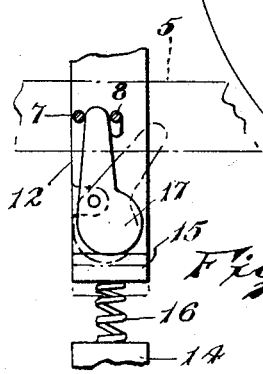

Patented June 2, 1931

1,807,690

UNITED STATES PATENT OFFICE

JOSEPH J. EHEMANN AND BENJAMIN F. SINGER, OF LANCASTER, PENNSYLVANIA

SAFETY DEVICE

Application filed May 4, 1929. Serial No. 360,582.

This invention is a safety device for use upon automobiles and its object is to provide a device which will automatically arrest the movement of the vehicle if it should start to travel backward on a down grade. It is the habit with motorists to take all grades in high gear to avoid the labor of shifting gears and it frequently happens that the machine stalls before the top of the hill has been reached and, unless the chauffeur is adept at shifting gears, the machine will travel backward some little distance before its progress can be stopped. Numerous bad accidents have occurred through the lack of means to instantly stop the rearward travel of the machine, and the object of the present invention, specifically stated, is to provide means which will automatically operate to prevent reverse travel of the vehicle on a down grade. The invention provides means whereby when the reverse travel of the machine is desired the safety device will be thrown into inoperative position and will then not interfere with the desired travel until the gears have been shifted to again provide for forward travel. The invention is illustrated in the accompanying drawings and will be hereinafter first fully described and then more particularly defined in the appended claims.

In the drawings:

Figure 1 is a sectional elevation of the transmission gearing of an automobile and the parts associated immediately therewith, Fig. 2 is an enlarged section taken longitudinally through the safety device.

Figs. 3 and 4 are elevations showing the operative and inoperative positions of the safety device, Fig. 5 is a detail perspective view of the hub, and Fig. 6 is a detail view of the shifting device which controls the safety device.

A portion of the engine casing is indicated at 1, and at 2 is indicated the transmission housing within which are transmission gears 3 of any approved arrangement. 4 designates the usual hand lever for shifting the gears through the medium of shifting rods 5 and selector yokes 6. In the present instance, the rod 5 which controls the reverse gear is equipped with pins 7 and 8 spaced longitudinally of the rod and arranged in the rear portion of the transmission housing. In carrying out the present invention, a case 9 is secured rigidly to the rear wall of the transmission housing and within this case is loosely fitted a ring 10. The ring 10 is constructed with an external annular groove 11 and a cap plate 12 is secured on the case 9 to extend into said groove and thereby retain the ring within the case, as will be understood upon reference to Fig. 2. Disposed within the groove and encircling the ring in advance of the cap plate 12 is a brake band 13, the ends of which are disposed at the top of the case in spaced relation and provided with outwardly projecting lugs or shoulders 14 and 15, between which is a spring 16 tending constantly to hold them apart. Pivotally mounted on the cap plate or ring 12 is a cam lever 17, the head of which bears against the side of the lug 15 and the arm or shank of which projects laterally from the lug into the path of the pins 7 and 8, it being noted that the lug 14 is anchored by an adjusting screw, as shown in Figs. 3 and 4.

The propeller shaft 18 passes concentrically through the case 9, and secured upon the shaft within the case is a hub 30 which is disposed within the bore of the ring 10. The hub is constructed with a series of right angular recesses 31 in its periphery which form with the inner wall of the ring 10 a plurality of triangular chambers. Disposed freely within the several chambers are rollers 20, and a cap plate 21 is secured upon the ring or upon the hub and extends across the rollers to prevent loss of the same. Slidably fitted in sockets 22 in the bases of the several triangular chambers are pins 23 carrying presser plates or cups 24 at their free ends which plates are adapted to engage the several rollers 20 and hold them in engagement with the opposed walls of the hub and the ring, as will be understood upon reference to Figs. 3 and 4, expansion springs 25 being fitted around the pins between the respective presser plates and the base walls of the chambers.

Normally the ring 10 will be held stationary by the brake band 13 and the forward rotation of the shaft 18 and the hub 30 secured thereon will cause the several rollers 20 to travel toward the base walls of the respective chambers against the tension of the springs 25. Should the travel of the vehicle be stopped and a tendency to travel backward develop, the reverse movement of the shaft will be prevented because the rollers 20 will then be caused to travel toward the points of the respective chambers and bind against the walls of the chambers. However, when reverse travel of the vehicle is desired, the gearing is shifted into reverse in the usual manner and this action causes the cam lever to release its pressure on the lug 15 so that said lug may move from the lug 14 and the brake band will be spread, thereby freeing the ring 10 so that it may turn with the hub. It will be noted that the forward pin 8 is offset but the pin 7 is straight. When the vehicle is at rest or in reverse the cam lever is in the position shown in full lines in Fig. 6 with the pin 7 at the rear thereof and in contact therewith. When the rod 5 is moved forward to permit forward travel of the vehicle, the pin 7 moves the lever to the position shown in dotted lines and then clears the lever. When the rod is moved rearwardly to throw in the reverse gear, the pin 8 will impinge against the lever and return it to the full line position, the last movement freeing the band from the ring and the first movement binding the band against the ring.

It will be readily noted that we have provided a very simple and inexpensive safety device which will operate automatically to prevent undesired backward travel of any vehicle to which it may be applied. The device may be applied to vehicles now building as well as to vehicles already in use and it will not require any extensive structural rearrangement in any parts of the vehicle.

It will, of course, be understood that the shifting collar or the entire mechanism may be located outside the casing, if preferred, and that the invention is not restricted to use upon automobiles but it may be installed upon any machinery where it may be advantageously employed.

Having thus described the invention, we claim:

1. In a safety device for reverse gears, the combination of a stationary case, a loose ring mounted concentrically within the case, a cap retaining the ring in the case, a hub rotatable within the ring, a split brake band encircling the ring and normally holding the same against rotation and having its ends provided with abutments, brake elements disposed between the hub and the ring whereby to permit rotation of the hub in one direction and prevent rotation of the hub in the opposite direction, and a cam lever mounted on the cap with its head bearing upon the side of one of said abutments and extending laterally therefrom and shiftable whereby to expand the band and release the ring to permit rotation of the ring with the hub or contract the band about the ring and prevent rotation of the ring.

2. In a transmission gearing including a reversing rod, the combination of a driving hub, a loose ring concentrically encircling the hub, brake elements disposed between the ring and the hub permitting relative rotation of the hub in one direction and preventing rotation in the opposite direction, a split brake band encircling the ring and normally holding the same stationary, the band having one end anchored and its other end provided with an abutment, a cam lever mounted adjacent said abutment with its head bearing against the side thereof and its free end projecting under the reversing rod, and a pair of pins depending from the reversing rod to engage the free end of the lever, the front pin being relatively offset whereby the rear pin will set the lever and the front pin will release it.

In testimony whereof we affix our signatures.

BENJAMIN F. SINGER. [L. S.]
JOSEPH J. EHEMANN. [L. S.]